M. E. MILLER.
DISH WASHING MACHINE.
APPLICATION FILED JULY 13, 1912.
1,049,896.
Patented Jan. 7, 1913.
2 SHEETS—SHEET 1.
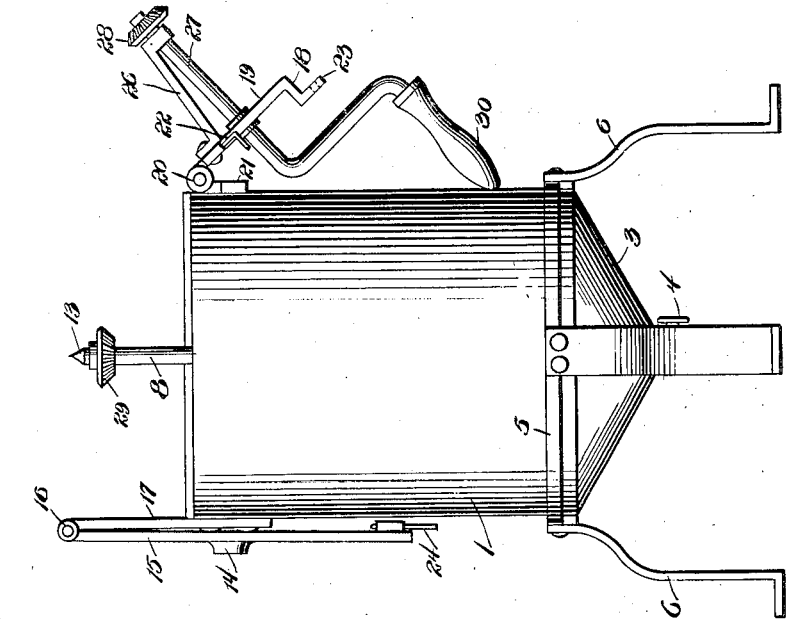
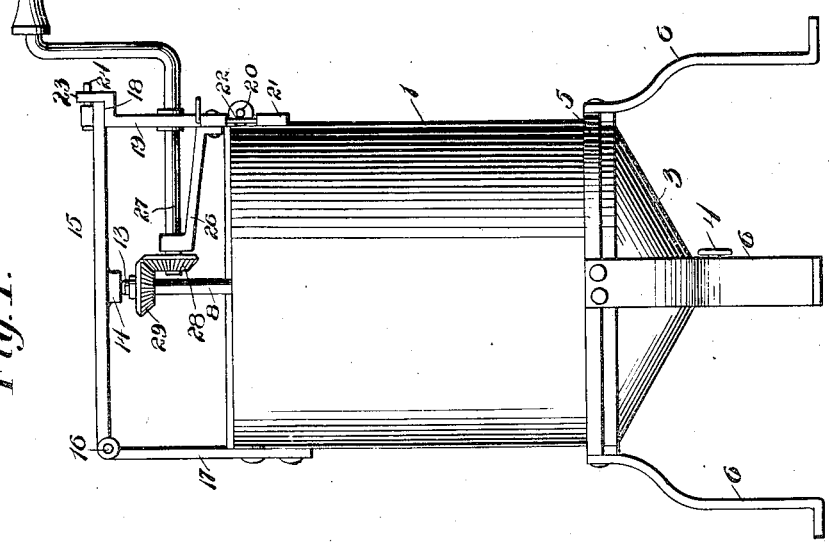
Witnesses
Wm. H. Mulligan
A. L. Evans
Inventor
Mary F. Miller
By Victor J. Evans.
Attorney M. E. MILLER.
DISH WASHING MACHINE.
APPLICATION FILED JULY 13, 1912.
1,049,896.
Patented Jan. 7, 1913.
2 SHEETS—SHEET 2.
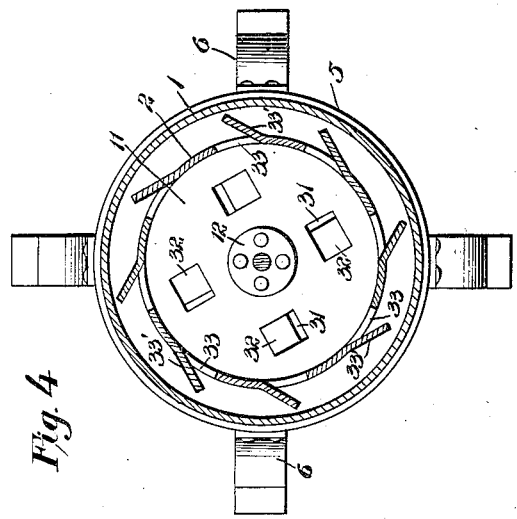
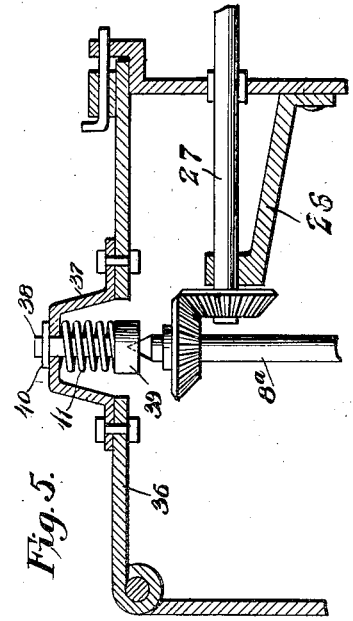
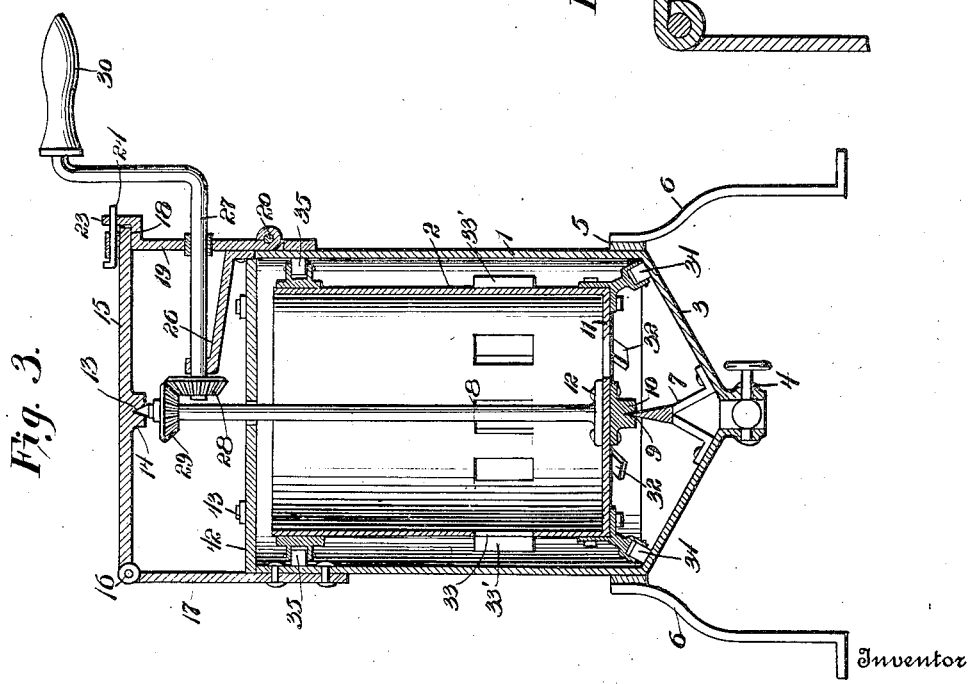
Witnesses
Wm H. Mulligan
A. L. Evans
Inventor
Mary E. Miller
By Victor J. Evans.
Attorney

UNITED STATES PATENT OFFICE.

MARY E. MILLER, OF GRANITE FALLS, WASHINGTON.

DISH-WASHING MACHINE.

1,049,896.

Specification of Letters Patent. Patented Jan. 7, 1913.

Application filed July 13, 1912. Serial No. 709,158.

*To all whom it may concern:*

Be it known that I, MARY E. MILLER, a citizen of the United States, residing at Granite Falls, in the county of Snohomish and State of Washington, have invented new and useful Improvements in Dish-Washing Machines, of which the following is a specification.

This invention relates to dish washing machines and has for an object to provide a machine of this character which will include a revolving vessel adapted to be mounted in a body of water whereby through centrifugal force water will be scattered through and against the articles so as to produce the maximum cleansing operation.

Another object of the invention is to provide apparatus of this character that can be operated manually with the minimum power.

A still further object of the invention is to provide apparatus which will include an inner dish or article container and an outer water containing vessel, the latter being removably associated with the former whereby the container and the vessel can be thoroughly cleaned when desired.

Another object of the invention is to provide washing apparatus wherein the walls of the article container will have minimum contact with the walls of the water container and to arrange the bearing portions so as to eliminate undue friction between the parts and to effectually sustain the weight of the dish or article container.

In the drawing forming a portion of this application, and in which like letters of reference indicate similar parts in the several views:—Figure 1 is a side view of the apparatus showing the driving and driven gears in intermeshing engagement. Fig. 2 is a similar view showing the top and side bearing brackets adjusted so as to permit of removal of the dish or article containing vessel. Fig. 3 is a vertical section through the machine. Fig. 4 is a horizontal section and Fig. 5 is a section through a slightly modified form of bearing bracket.

The dish washer comprises an outer water containing vessel 1 and an inner dish or article containing vessel 2, the latter being rotatably mounted in the former and being constructed whereby under centrifugal force the water will be compelled to circulate with considerable force in both vessels so as to positively subject the dishes or articles to be cleaned to the full force of the circulating water. The outer water containing vessel 1 is preferably provided with a substantially inverted conical bottom 3 whose walls extend in the direction of a discharge faucet 4. By inclining the walls of the bottom 3 in the direction of the discharge faucet 4 it is evident that the water will be permitted to thoroughly drain from the vessel 1 when the faucet is opened. The outer vessel 1 is preferably embraced by a ring 5, to which supporting legs 6 are secured whereby the machine will find the required purchase against the floor during the cleaning operation.

A bearing 7 rises vertically from the bottom 3, being disposed in axial alinement with the driven shaft 8 and having a pointed extremity 9 which is fitted in a step bearing 10 in the bottom of the article or dish containing vessel 2. The vessel 2 has its vertical walls spaced from the vertical walls of the vessel 1 while the bottom 11 of the vessel 2 is spaced from the bottom 3 as shown. The vessel 2 has the lower end of the driven shaft 8 secured as at 12 to the center of the bottom 11 and as illustrated the shaft 8 is provided with a pointed bearing end 13 which is disposed above the plane of the vessels 1 and 2 and which is revolubly mounted in a bearing socket 14 in a bracket 15. The bracket 15 extends horizontally across the vessels 1 and 2, being hingedly connected at 15 to a vertical standard 17 which rises from one side of the vessel 1, while the opposite end of the bracket 15 rests upon a horizontal shoulder 18 of a standard 19 which also rises from one side of the vessel 1 and which is hinged thereto as at 20 whereby it may be swung down against one side of the vessel as shown in Fig. 2 of the drawings. A latch bolt 22 upon the bracket 19 is removably engaged with a keeper 21 on the vessel 1. When the bolt is engaged with the keeper as shown in Fig. 1 the said standard 19 is effectually held against breaking on the hinge 20. A vertical extension 23 of the shoulder 18 has a keeper passage 24 therein which is designed to receive a sliding bolt 24 upon the bracket 15 whereby the latter is held against swinging movement.

The standard 19 is provided with a bearing 26 and as illustrated a driving shaft 27 is journaled therein and in the standard, the shaft being provided with a fixed driving gear wheel 28 which meshes with a gear wheel 29 on the shaft 8 as shown in Fig. 1. The shaft 27 carries an operating crank handle 30 which may be controlled manually whereby power transmitted to the shaft 27 will impart rotary movement to the article containing vessel 2. The bottom 11 of the receptacle 2 is provided with an annular series of openings 31 and agitating flanges or surfaces 32. The surfaces 32 are inclined in the direction of the bottom 3 of the receptacle 1 so that when the vessel 2 is revolved water in the vessel 1 will be agitated and circulated and deflected into the vessel 2. The vessel 2 is also provided with circumferential openings 33 and tangentially disposed agitating surfaces or flanges 33' which are designed to create a circulatory agitation of the water in the vessel 2.

From the construction of the machine described it is evident that dishes or other articles when placed in the vessel 2 will be thoroughly subjected and treated to the circulating water with a resultant thorough cleansing of the articles. Incident to the construction of the bracket 15 and the standard 19 it is seen that when they are adjusted to the positions shown in Fig. 2 the vessels 1 and 2 may be separated from each other where they may be cleaned and maintained in a highly sanitary condition.

Bearing rollers 34 are secured to the lower corner of the vessel 2 and are adapted to travel across the adjacent inner walls of the bottom 3. The bottom 3 thereby forms a stop to limit the vertical adjustment of the vessel 2. To maintain the vessels 1 and 2 in proper spaced relation vertically and to eliminate undue friction of the parts when the inner vessel is rotated I provide the said inner vessel near its upper end with radially extending rollers 35 which are adapted to travel against the adjacent surfaces of the vertical walls of the vessel 1.

In the modified form of the invention shown in Fig. 5 the bearing bracket 36 of the outer vessel is provided with a centrally located yoke 37 in which is mounted for vertical movement a rectangular stem 38. Beneath the yoke the stem supports a socket member 39 for receiving the upper extremity of the driven shaft 8ª, while above the yoke the stem is provided with a stop 40. A spring 41 is interposed between the socket member and the yoke 37. From this construction it is stated that the yieldable socket bearing 39 will accommodate itself to vertical movements of the vessel 2ª, which movements may result when the machine is in operation. A cover 42 is adapted to close the upper ends of the inner and outer vessels and as illustrated said cover is provided with suitable clamps 43 which are adapted to be engaged with the outer vessel to hold the cover in closed position.

I claim:—

1. A dish washer comprising an outer vessel having a substantially inverted conical bottom, an inner vessel revolubly mounted in the outer vessel and provided with lower rollers adapted to travel over the bottom of the outer vessel, lateral side rollers carried by the inner vessel and adapted to travel over the adjacent walls of the outer vessel, and means for revolving the inner vessel.

2. A dish washer comprising an outer vessel, a fixed bearing thereon, an adjustable portion on the vessel, an inner vessel having its bottom journaled on the said bearing, a driven shaft carried by the inner vessel and having its upper end journaled in the said adjustable portion of the outer vessel, means for driving the said driven shaft, and an adjustable support for the driving means.

3. A dish washer comprising an outer vessel, a fixed bearing thereon, an adjustable portion on the vessel, an inner vessel having its bottom journaled on the said bearing, a driven shaft carried by the inner vessel and having its upper end journaled in the said adjustable portion of the outer vessel, means for driving the said driven shaft, a pivoted support for the driving means, and means for holding the pivoted support against movement.

4. A dish washer comprising an inner revolving vessel having a foraminous portion, an outer fixed vessel, the inner vessel being removably mounted in the outer vessel and having anti-friction bodies adapted to travel over the walls of the outer vessel, a fixed bearing rising from the bottom of the outer vessel, a seat receiving the bearing, the said seat being secured to the bottom of the inner vessel, an adjustable bracket carried by the outer vessel, a driven shaft carried by the inner vessel and having engagement with the said bracket, means for holding the bracket against movement, and means for driving the said driven shaft.

5. A dish washer comprising an inner revolving vessel having a foraminous portion, an outer fixed vessel, the inner vessel being removably mounted in the outer vessel and having anti-friction bodies adapted to travel over the walls of the outer vessel, a fixed bearing rising from the bottom of the outer vessel, a seat receiving the bearing, the said seat being secured to the bottom of the inner vessel, an adjustable bracket carried by the outer vessel, a driven shaft carried by the inner vessel and having engagement with the said bracket, means for holding the bracket against movement, means for driving the said driven shaft, and an adjustable support carrying the driving means and having a shoulder for supporting the said adjustable bracket.

In testimony whereof I affix my signature in presence of two witnesses.

MARY E. MILLER.

Witnesses:
KATHARINE MOORE,
J. A. MOORE.